United States Patent
Trainin et al.

(10) Patent No.: US 10,863,351 B2
(45) Date of Patent: Dec. 8, 2020

(54) DISTRIBUTION NETWORK SUPPORT

(71) Applicant: QUALCOMM Incorporated, San Diego, CA (US)

(72) Inventors: Solomon Trainin, Haifa (IL); Assaf Yaakov Kasher, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 16/047,299

(22) Filed: Jul. 27, 2018

(65) Prior Publication Data

US 2019/0037397 A1    Jan. 31, 2019

Related U.S. Application Data

(60) Provisional application No. 62/539,151, filed on Jul. 31, 2017.

(51) Int. Cl.
| | | |
|---|---|---|
| H04W 12/06 | (2009.01) | |
| H04W 4/08 | (2009.01) | |
| H04W 76/10 | (2018.01) | |
| H04W 72/12 | (2009.01) | |
| H04W 84/18 | (2009.01) | |

(52) U.S. Cl.
CPC .......... *H04W 12/06* (2013.01); *H04W 4/08* (2013.01); *H04W 76/10* (2018.02); *H04W 72/12* (2013.01); *H04W 84/18* (2013.01)

(58) Field of Classification Search
CPC ....... H04W 12/06; H04W 76/10; H04W 4/08; H04W 84/18; H04W 72/12
See application file for complete search history.

(56) References Cited

U.S. PATENT DOCUMENTS

| | | | | |
|---|---|---|---|---|
| 2004/0213218 A1* | 10/2004 | Dougherty | ........ | H04L 29/12311 370/386 |
| 2006/0121951 A1* | 6/2006 | Perdomo | ................. | H04W 4/12 455/572 |
| 2007/0140191 A1* | 6/2007 | Kojima | ................. | H04W 76/23 370/338 |
| 2009/0019539 A1* | 1/2009 | Jonnalagadda | ....... | H04W 12/12 726/14 |
| 2010/0265867 A1* | 10/2010 | Becker | ................ | H04W 72/005 370/312 |
| 2011/0199966 A1 | 8/2011 | Cordeiro et al. | | |
| 2013/0142095 A1* | 6/2013 | Calcev | .............. | H04W 52/0219 370/311 |
| 2014/0105008 A1* | 4/2014 | Bombacino | ....... | H04W 12/0802 370/230 |
| 2015/0004984 A1* | 1/2015 | Kim | ........................ | H04W 4/80 455/440 |

(Continued)

FOREIGN PATENT DOCUMENTS

EP    2958377 A1    12/2015

OTHER PUBLICATIONS

International Search Report and Written Opinion—PCT/US2018/044258—ISA/EPO—dated Oct. 26, 2018.

*Primary Examiner* — Matthew Smithers
(74) *Attorney, Agent, or Firm* — Patterson+ Sheridan, L.L.P.

(57) ABSTRACT

Certain aspects of the present disclosure provide methods and apparatus for providing secure network association services to a device seeking to join a distribution network.

17 Claims, 10 Drawing Sheets

(56) References Cited

U.S. PATENT DOCUMENTS

2015/0324601 A1* 11/2015 Burba ............... H04W 12/0609
  726/28
2016/0219024 A1* 7/2016 Verzun ..................... H04L 9/34
2017/0070881 A1 3/2017 Sun et al.
2019/0380139 A1* 12/2019 Xiong ................. H04W 72/044

* cited by examiner

DISTRIBUTION NETWORK SUPPORT

CLAIM OF PRIORITY UNDER 35 U.S.C. § 119

This application claims the benefit of U.S. Provisional Patent Application Ser. No. 62/539,151, filed Jul. 31, 2017, which is herein incorporated by reference in its entirety.

FIELD

Certain aspects of the present disclosure generally relate to wireless communications and, more particularly, to distribution networks that utilize point-to-point communication between devices.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11 ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes at least one interface and a processing system configured to provide, by an exchange of frames via the interface: secure network association services to a wireless device that wishes to join a distribution network, and information for the wireless device for use in communicating in the distribution network.

Certain aspects of the present disclosure provide an apparatus for wireless communications. The apparatus generally includes at least one interface; and a processing system configured to: perform, by an exchange of frames via the interface, secure network association services with a wireless device to join a distribution network, obtain information for the wireless device for use in communicating in the distribution network, and use the information to communicate in the distribution network.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
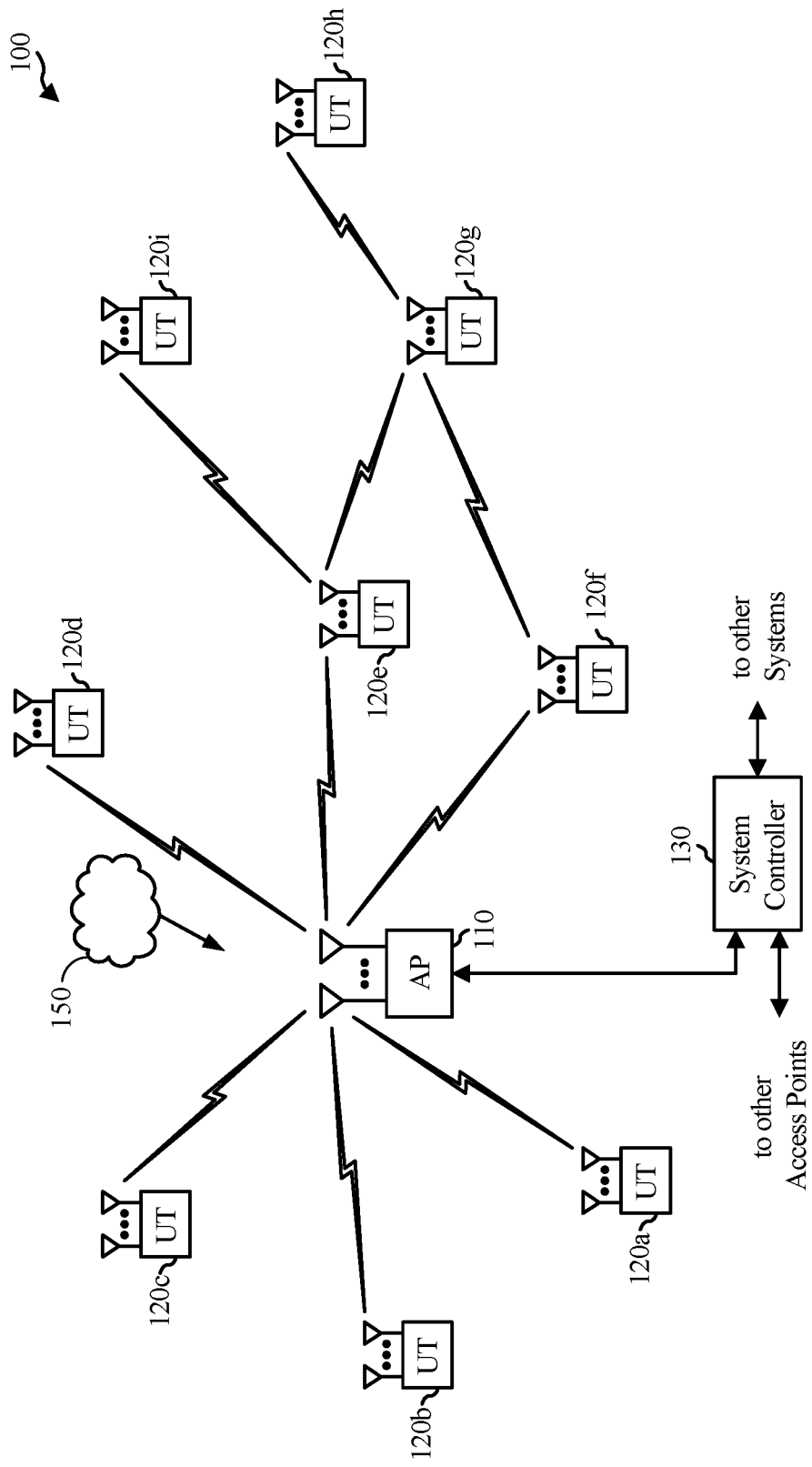
FIG. 1 is a diagram of an example wireless communications network, in accordance with certain aspects of the present disclosure.

Certain aspects of the present disclosure provide methods and apparatus for performing positioning based on directional transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates an example wireless communications system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
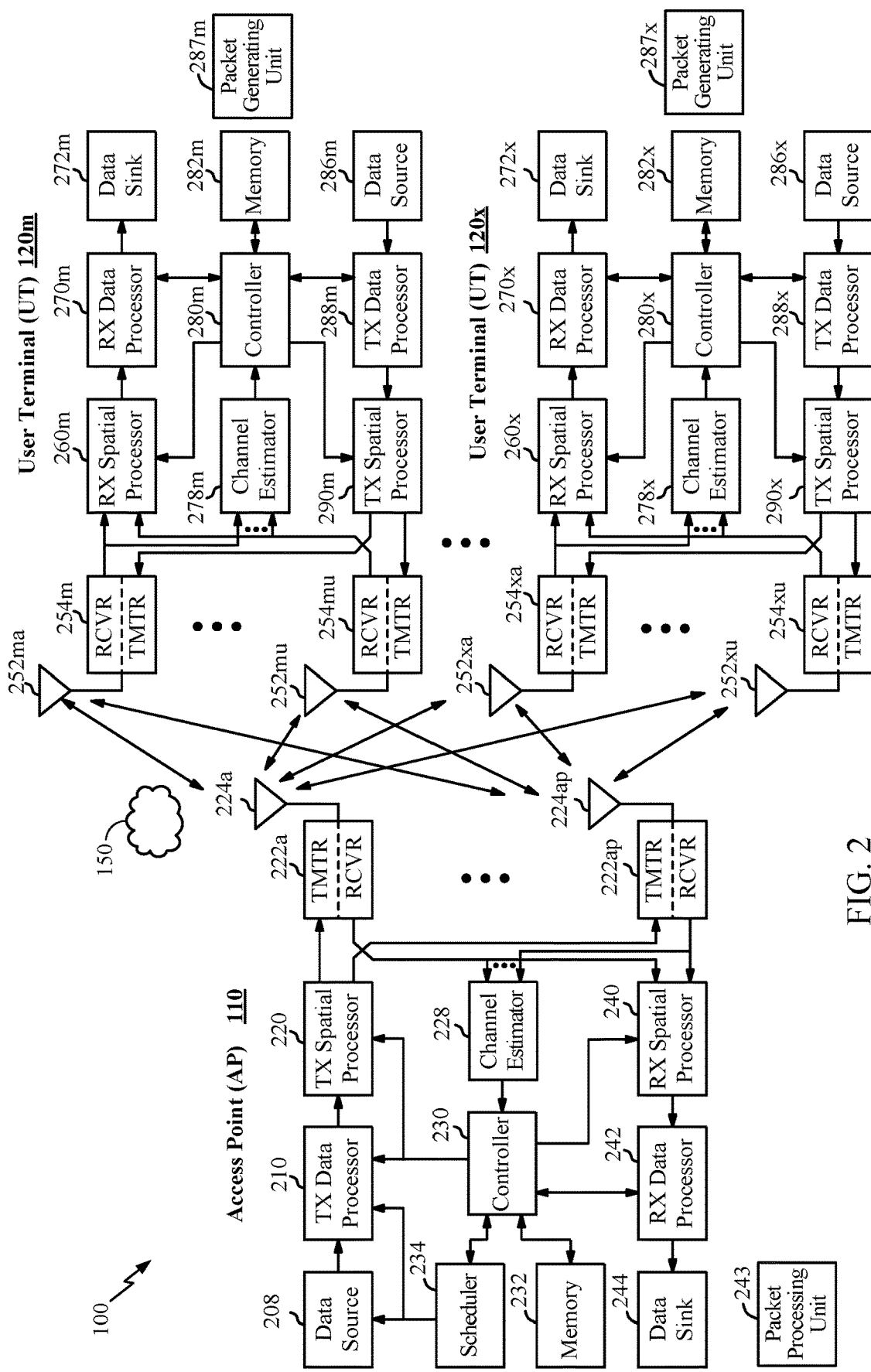
FIG. 2 is a block diagram of an example access point and example user terminals, in accordance with certain aspects of the present disclosure.

FIG. 2 illustrates a block diagram of access point 110 and two user terminals 120m and 120x in system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150, with a preamble format as described herein (e.g., in accordance with one of the example formats shown in FIGS. 3A-3B), to the access point 110 as part of a UL transmission, for example. Each packet 150 may be transmitted on a set of one or more spatial streams (e.g., up to 4). For certain aspects, the preamble portion of the packet 150 may include tone-interleaved LTFs, subband-based LTFs, or hybrid LTFs (e.g., in accordance with one of the example implementations illustrated in FIGS. 10-13, 15, and 16).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a packet 150 based on the IEEE 802.11 standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
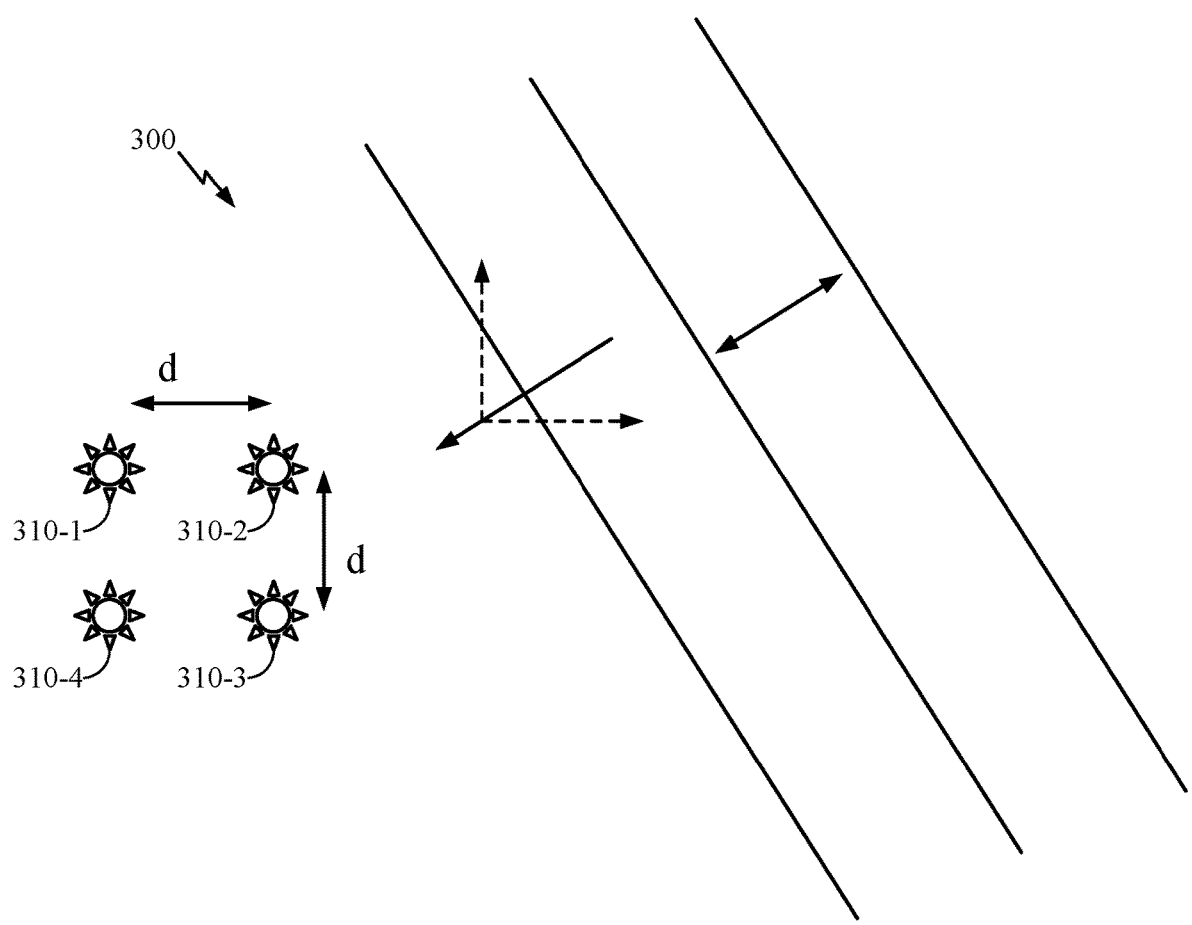
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

Example of Distribution Network in 60 GHz Spectrum

Aspects of the present disclosure provide techniques for providing secure network and association services to allow a device to join a distribution network (DN). The techniques may also provide information used to communicate in the DN, such as scheduling and clock offset information.

The techniques presented herein may allow for the implementation of DNs in the 60 GHz spectrum. Such implementations may include features such as, for example, scheduled access to help mitigate interference. Such scheduled access may be provided by allocating service periods (SPs) in which devices communicate via simplex communication, effectively implementing time division multiplexing (TDD). As used herein, Simplex and TDD may be used interchangeably and generally refer to communications via a channel that sends information in one direction only (as opposed to full-duplex communication in which two entities can communicate with each other simultaneously or half-duplex communication in which each entity can communicate with the other but not simultaneously).

Aspects of the present disclosure may provide DN support, for example, in a system in-line with an 802.11 standard for 60 GHz spectrum that currently lacks any such feature. Aspects of the present disclosure may provide secure network association services to a device seeking to join a DN and subsequent allocation of SPs to communicate between nodes in the DN to eliminate interference (e.g., using simplex communication).

Figure 4:
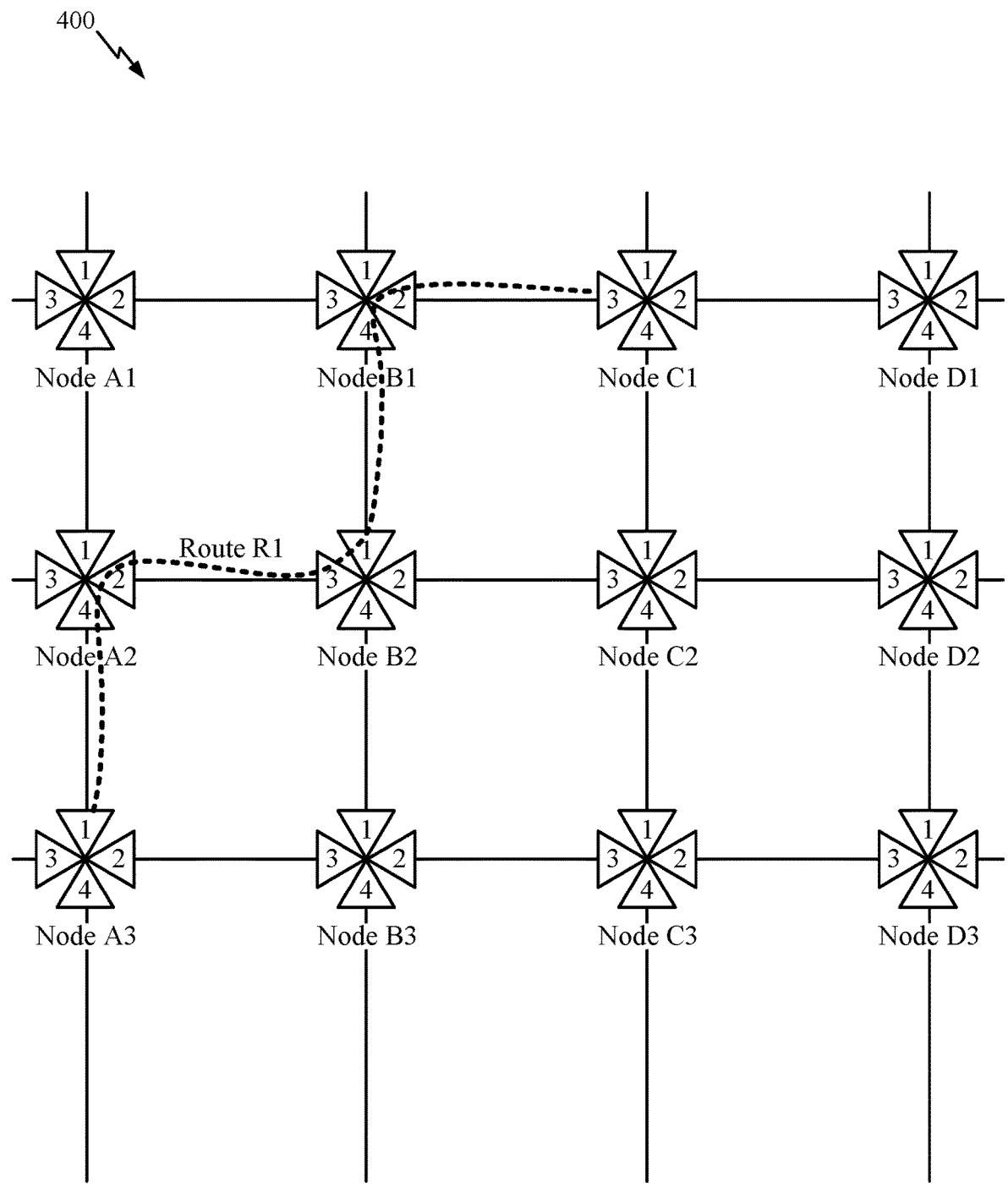
FIG. 4 illustrates an example of a distributed network in which aspects of the present disclosure may be practiced.

As illustrated in FIG. 4, a DN 400 may be formed by DN nodes that each contain one or more non-AP STAs. The DN nodes may communicate using point-to-point (e.g., 802.11ad) links between stations (STAs). Routing functions that determine a path from a source to an intended target may be provided by protocols above a logical link control (LLC) level.

In the example illustrated in FIG. 4, DN 400 includes Nodes A1-A3, B1-B3, C1-C3, and D-D3, with each node include multiple stations. The stations may be oriented to optimize communications in a given direction, with the group of stations providing collective "omnidirectional" coverage.

For illustrative purposes only, in the example shown, each node contains 4 stations: STA1, STA2, STA3, and STA4. The STAs may have physical or virtual instantiation (meaning the STAs may have separate hardware components and physical resources or they may share resources as virtual STAs). Each STA may have its own MAC address locally or globally administered (and the routing functionality may be provided by mapping IP addresses to MAC addresses).

As illustrated, in some cases, only one STA of each Node may be used to connect to any one other Node. For example, STA2 of Node A1 is used to connect to STA3 of Node B1, while STA4 of Node A1 is used to connect to STA1 of Node A2, and so on. STAs not connected to a STA of another node may act as an access point (e.g., providing secure network association services to joining nodes, as described below).

In some cases, a route that communicates between two end Nodes may be designed to cross as few other Nodes in the DN 400. For example, as shown, a Route R1 may be provided that crosses Nodes A2, B2, B1 to communicate Node A3 with Node C1. As noted above, each node may provide layer 3 routing to communicate between end points. DN timing may be synchronized in any suitable manner, for example, via GPS or some other type of independent clock source. Synchronization may be important to allow each node (or STA thereof) when they can access the medium after receiving scheduling information (e.g., that refers to service period and clock offsets relative to the DN timing).

Aspects of the present disclosure may provide robust security network association services, for example, that may allow a device to join such a DN based on a point to point architecture as shown in FIG. 4. The robust security network association services may include various services, for example, secure authentication, association and cryptographic key establishment. The techniques presented herein may provide flexibility, allowing devices to join a DN, while maintaining security.

Figure 5:
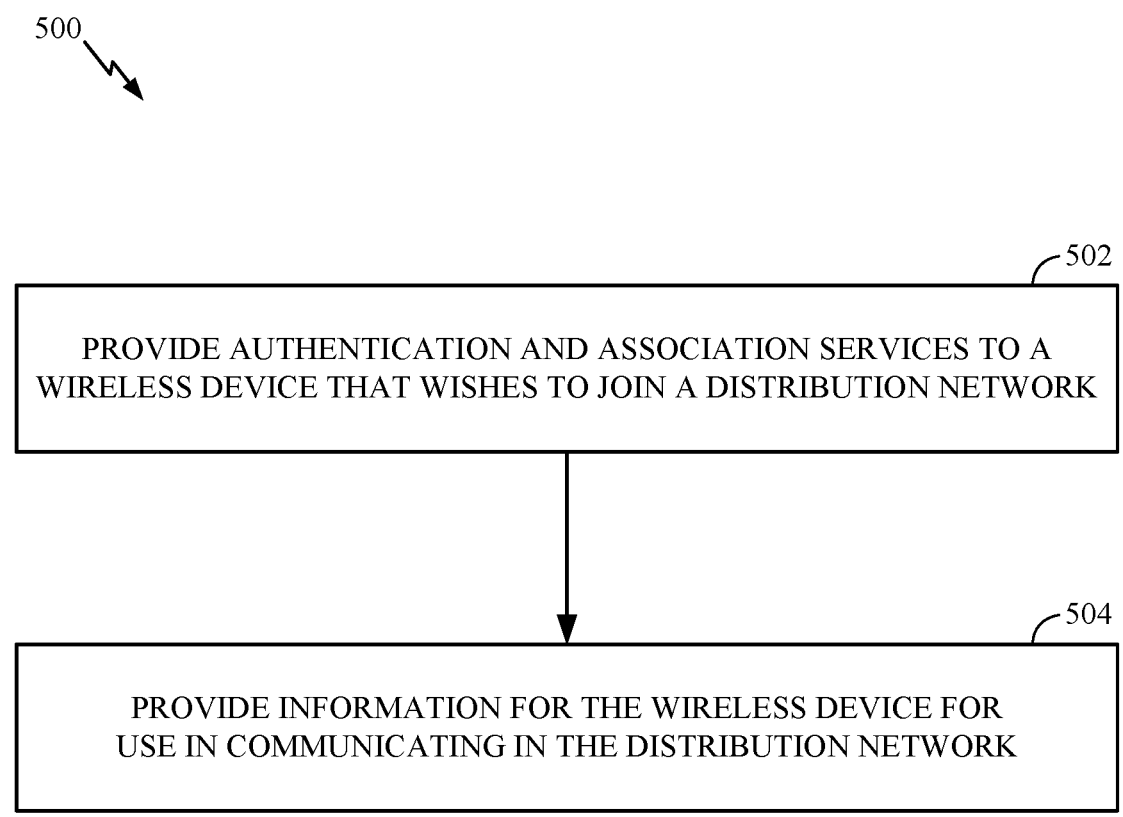
FIG. 5 illustrates example operations for performing secure network association to a device joining a distribution network, in accordance with certain aspects of the present disclosure.

FIG. 5 illustrates example operations 500 that may be performed to provide robust security network association services to a device seeking to join a DN. Operations 500 may be performed, for example, by a STA of a DN node that is not currently connected to another node. For example, operations 500 may be performed by STA1 of Node B1 (since that station is not connected to another node) or by any other node STAs that are not connected to another node.

Operations 500 begin, at 502, by providing secure network association services to a wireless device that wishes to join a distribution network. At 504, the station provides information for the wireless node for use in communicating in the distribution network.

Figure 6:
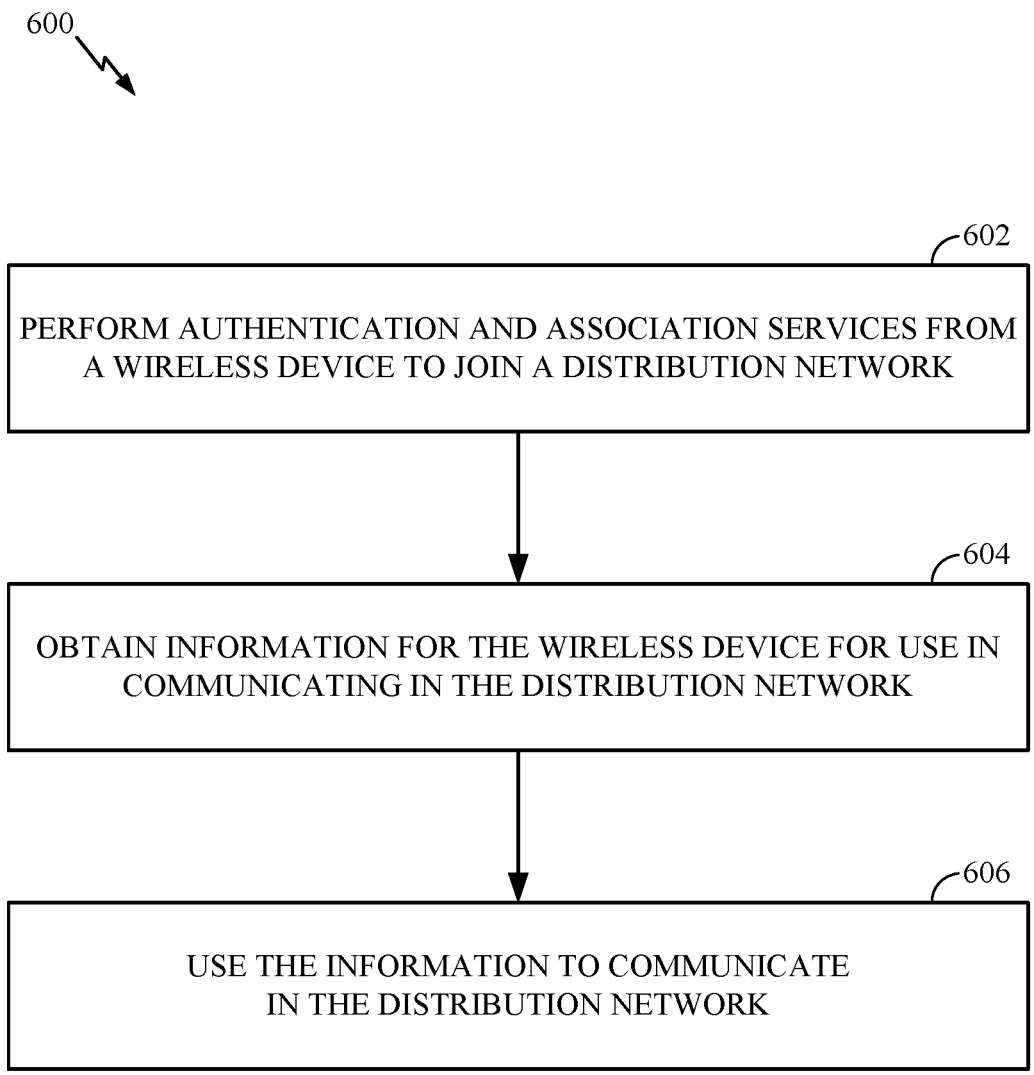
FIG. 6 illustrates example operations for joining a distribution network, in accordance with certain aspects of the present disclosure.

FIG. 6 illustrates example operations 600 that may be performed by a device seeking to join a DN. Operations 600 may be performed, for example, by a STA of a DN node that is not currently connected to another node and seeks to connect to the DN via another node station (e.g., a STA capable of performing operations 500 of FIG. 5).

Operations 600 begin, at 602, by performing secure network association services with a wireless device to join a distribution network. At 604, the station obtains information, from the wireless device, for use in communicating in the distribution network. At 606, the station communicates in the distribution network using the information.

As described above, the operations 500 may be performed by a STA (of one DN node) that is not connected to another STA (of another DN node), to provide association and authentication of a new node seeking to join the DN. Results of the association/authentication may be transferred to and used by non-AP STA instance of the same STA.

Another feature that may be provided includes modification of a traffic specification (TSPEC) Element and an Extended Schedule Element such that they may provide support indication of simplex communication. A STA acting as an AP STA may be considered as being in a first operating mode, while a non-AP STA may be considered as being in a second operating mode.

Figure 7:
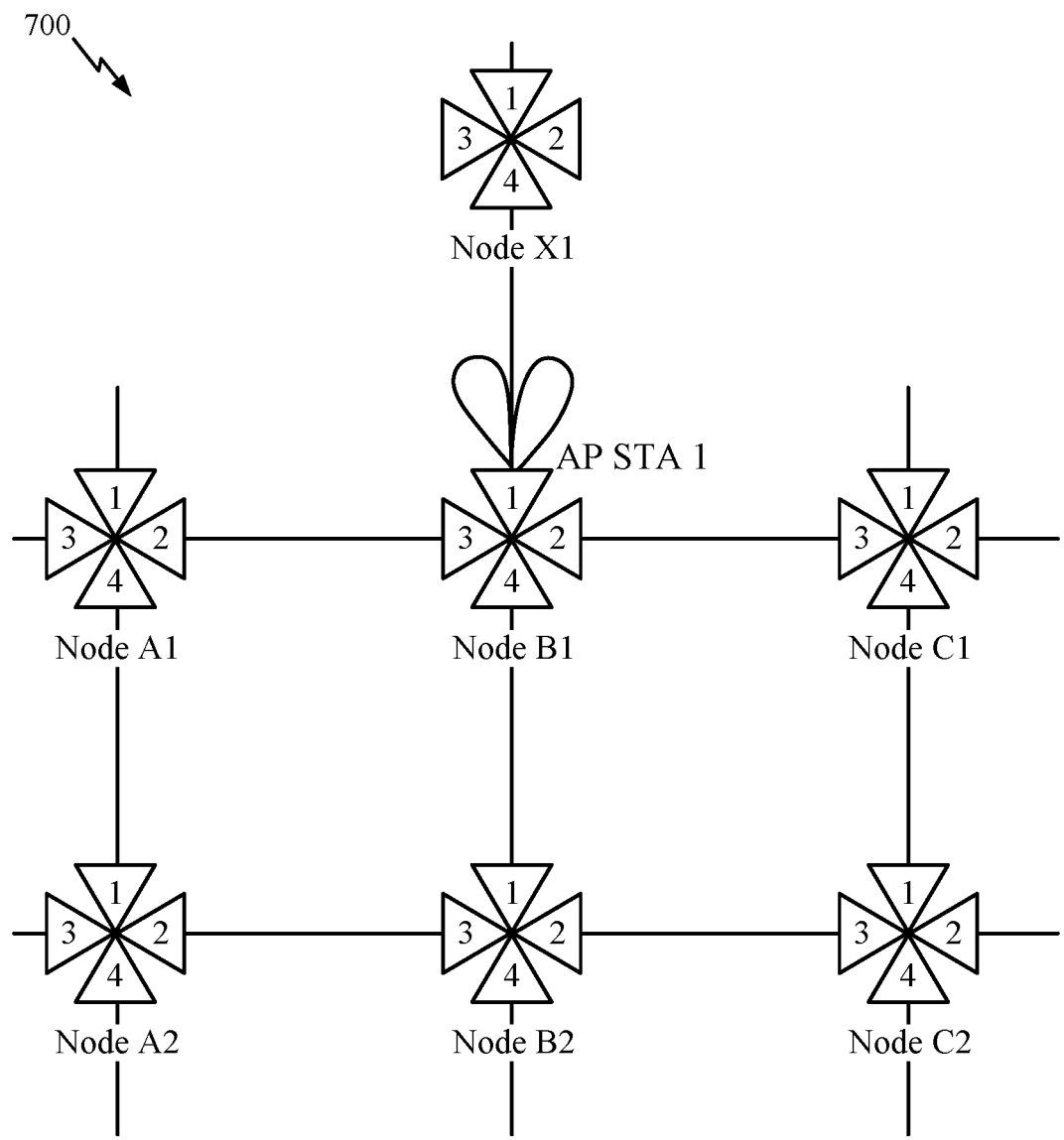
FIG. 7 illustrates an example of a node joining a distribution network, in accordance with certain aspects of the present disclosure.

FIG. 7 illustrates an example of connecting a new node (Node X1) to a distribution network (DN) 700, in accordance with aspects of the present disclosure. As shown, new Node X1 may be added to the DN 700. In this example, (STA1 of) Node B1 may perform operations 500 to provide robust security network association services to Node X1, while (STA4 of) Node X1 may perform operations 600.

In the illustrated example, initially STA1 of Node B1 is not connected to any other node and may, therefore, be functioning as an AP at the time the new Node X1 appears in proximity of the Node B1. For example, the Node X1 may respond to a beacon of STA1 (that STA1 sends while acting as an AP). Based on the beacon, Node X1 may then establish basic connectivity with the AP STA1 of Node B1. Node X1 may then proceed with association and authentication procedures provided via AP STA1 of Node B1.

AP STA1 of Node B1 may provide any suitable type of relevant information that the new Node X1 may need for proper functioning inside the DN. For example, this information may include scheduling, clock offset, and other information. In some cases, once the association is established and Node B1 is authenticated, Node B1 may switch the STA1 to a non-AP STA1 mode. After switching, STA1 of Node B1 may be served for communication with the Node X1.

In some cases, various data structures may be provided to support the functionality described above. For example, such data structures may carry the various information used to provide support of simplex communication allocation.

Figure 8:
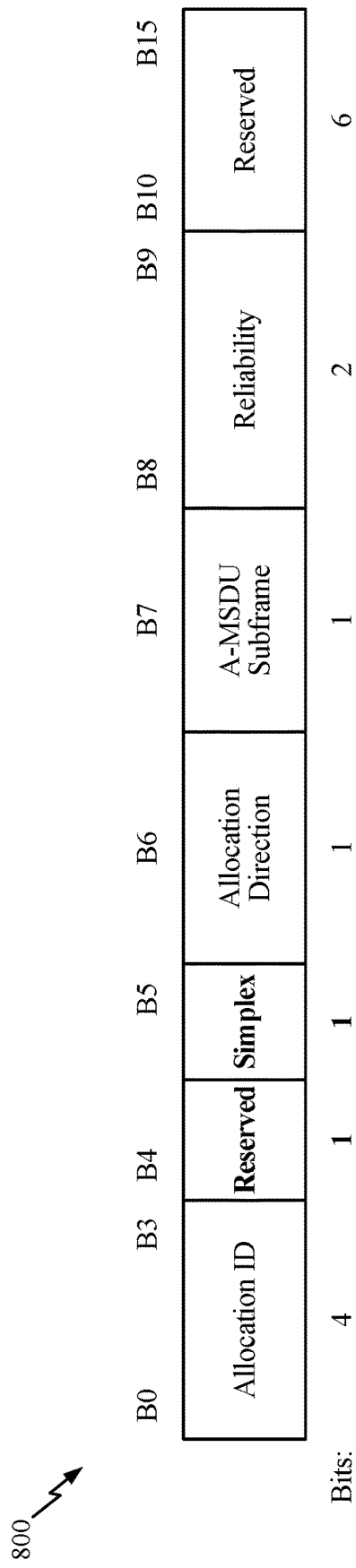
FIG. 8 illustrates an example data structure to request scheduling of service periods (SPs) for communicating in a distribution network, in accordance with certain aspects of the present disclosure.

For example, a joining node may request scheduling for simplex communications, via a field (e.g., a directional multi-Gigabit "DMG" attributes field) having the format for a TSPEC element 800 shown in FIG. 8.

As shown, the TSPEC element 800 may include changes to the subfields relative to existing field formats. For example, as shown, a Simplex subfield may be provided that may be 1 bit in length and may contain a value that indicates a communication type to be used for SP of this Allocation ID. For example, the Simplex subfield may be set to 1 indicating the simplex communication or set to 0 otherwise. This simplex subfield may not be applicable for any types of contention-based access period (CBAP) allocation.

Figure 9:
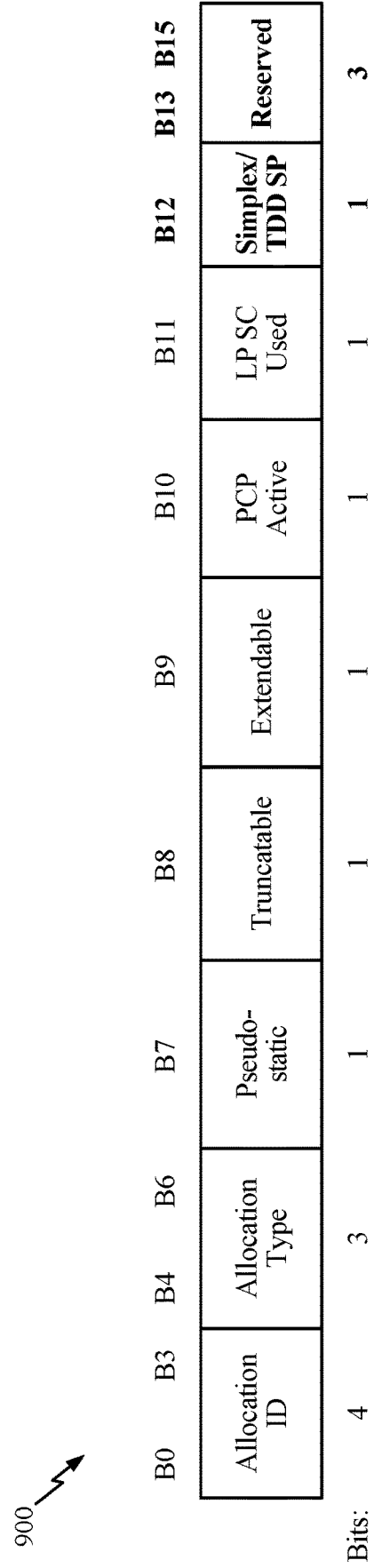
FIG. 9 illustrates an example data structure to indicate an allocation of service periods (SPs) for communicating in a distribution network, in accordance with certain aspects of the present disclosure.

FIG. 9 illustrates an example format for an extended scheduling element 900, in accordance with aspects of the present disclosure.

As illustrated, the extended schedule element 900 may include a simplex/TDD subfield. For example, when the simplex/TDD subfield is set to a nonzero value, this may indicate that an SP allocated from Source AID to Destination AID is used for simplex/TDD communication. Otherwise, the simplex/TDD subfield may be set to zero. As with TSPEC element 800, the simplex/TDD subfield of the extended scheduling element 900 may not be applicable for all types of CBAP allocation.

In some cases, the format of the extended schedule element 900 may be used to send (e.g., from a STA acting as an AP) a newly joining node an indication that the association and authentication was successful. Upon receiving this indication, the newly joined node may begin communicating in the DN (e.g., according to the SPs allocated for simplex communication).

Figure 5A:
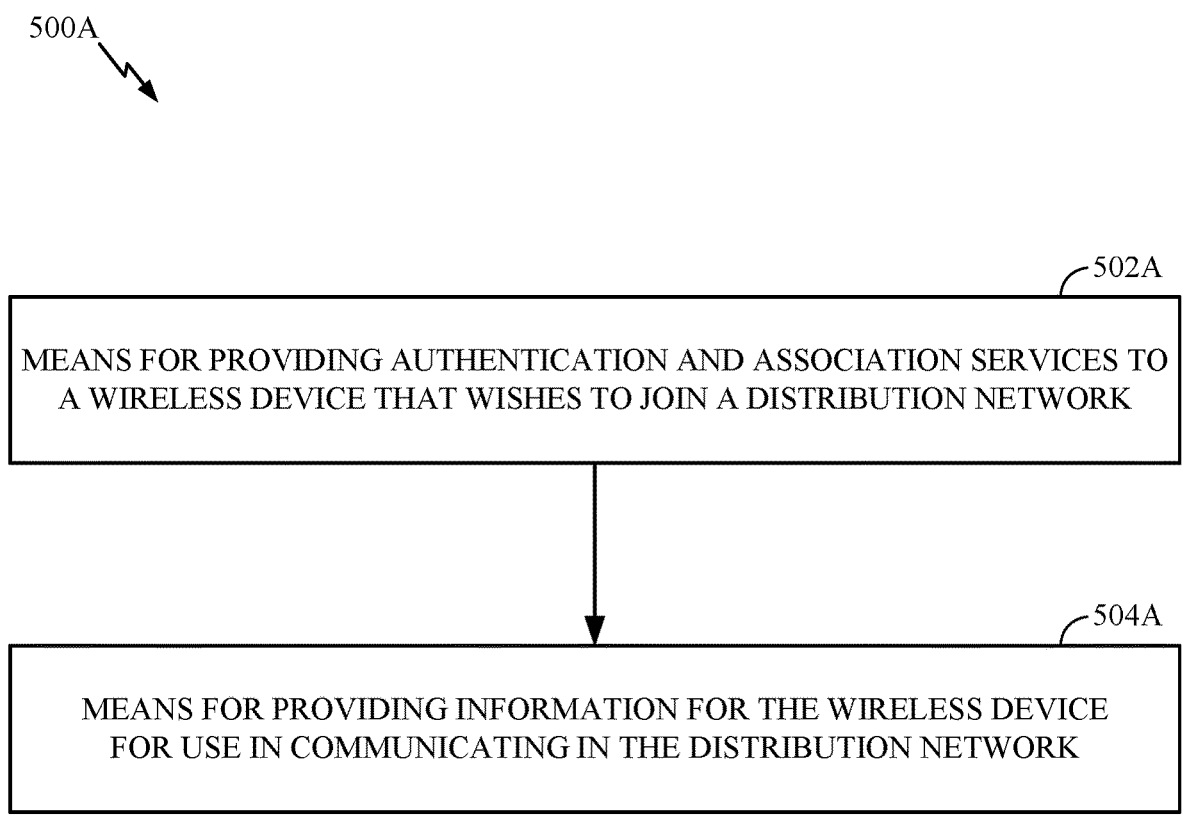
FIG. 5A illustrates example components capable of performing the operations shown in FIG. 5.
Figure 6A:
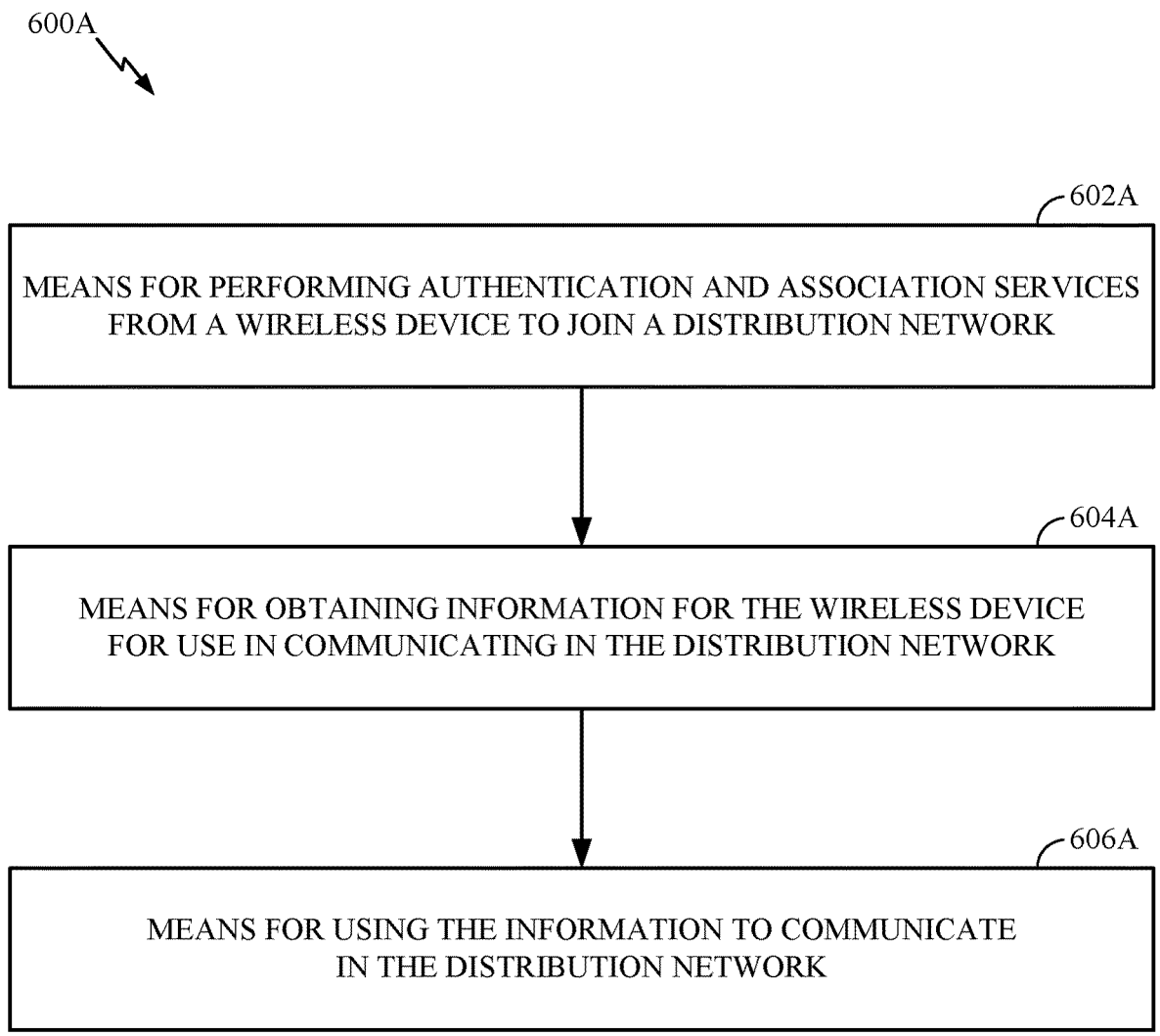
FIG. 6A illustrates example components capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A.

For example, means for obtaining may comprise a receiver (e.g., the receiver unit 222) and/or an antenna(s) 224 of the access point 110 or the receiver unit 254 and/or antenna(s) 254 of the user terminal 120 illustrated in FIG. 2. Means for outputting frames for transmission may comprise a transmitter (or other interface). Means for exchanging frames may include a single or multiple interfaces (e.g., a transceiver or separate receiver and transmitter). Means for providing, means for switching, means for generating, means for performing, and means for using may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

In some cases, rather than separate interfaces, a single interface may be used to exchange frames with another device. For example, a single interface may be a transceiver with both transmit and receive functions (or functionality to both output frames for transmission and obtain frames).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   at least one interface; and
   a processing system configured to:
      provide, by an exchange of frames via the interface;
         secure network association services to a wireless device that wishes to join a distribution network; and
         information for the wireless device for use in communicating in the distribution network, wherein the information comprises at least one of scheduling or clock offset for service periods used for communicating in the distribution network.

2. The apparatus of claim 1, wherein:
   the secure network association services are provided while the apparatus is in a first operating mode; and
   the processing system is configured to switch the apparatus to a second operating mode after providing the secure network association services.

3. The apparatus of claim 1, wherein the secure network association services comprise at least one of: secure authentication, association or cryptographic key establishment.

4. The apparatus of claim 1, wherein the information is provided as part of the secure network association services.

5. The apparatus of claim 1, wherein the service periods are used for simplex communications between nodes of the distribution network.

6. The apparatus of claim 5, wherein:
   the apparatus is part of a first one of the nodes of the distribution network; and
   the wireless device is part of a second one of the nodes of the distribution network.

7. The apparatus of claim 1, wherein:
   the interface is configured to obtain a first frame, from the wireless device, indicating a scheduling request for simplex communications;
   the processing system is configured to generate a second frame, including the information, in response to the request; and
   the interface is configured to output the second frame for transmission.

8. An apparatus for wireless communications, comprising:
   at least one interface; and
   a processing system configured to:
      provide, by an exchange of frames via the interface:
         secure network association services to a wireless device that wishes to join a distribution network; and
         information for the wireless device for use in communicating in the distribution network; and
         generate a frame to indicate the wireless device is allocated service periods for simplex communications in the distribution network, wherein the interface is configured to output the frame for transmission to the wireless device.

9. An apparatus for wireless communications, comprising:
   at least one interface; and
   a processing system configured to:
      perform, by an exchange of frames via the interface, secure network association services with a wireless device to join a distribution network;
      obtain information for the wireless device for use in communicating in the distribution network; and
      use the information to communicate in the distribution network, wherein the information comprises at least one of scheduling or clock offset for service periods used for communicating in the distribution network.

10. The apparatus of claim 9, wherein the secure network association services comprise at least one of: secure authentication, association or cryptographic key establishment.

11. The apparatus of claim 9, wherein the information is obtained as part of the secure network association services.

12. The apparatus of claim 9, wherein the service periods are used for simplex communications between nodes of the distribution network.

13. The apparatus of claim 9, wherein:
   the apparatus is part of a first of the nodes of the distribution network; and
   the wireless device is part of a second of the nodes of the distribution network.

14. The apparatus of claim 9, wherein:
   the processing system is further configured to generate a frame indicating a scheduling request for simplex communications; and
   the interface is configured to output the frame for transmission to the wireless device.

15. The apparatus of claim 9, further comprising at least one antenna via which the frames are exchanged, wherein the apparatus is configured as a wireless station.

16. An apparatus for wireless communications, comprising:
   at least one interface configured to obtain, from the wireless device, a frame that indicates the apparatus is allocated service periods for simplex communications in a distribution network; and
   a processing system configured to:
      perform, by an exchange of frames via the interface, secure network association services with a wireless device to join the distribution network;
      obtain information for the wireless device for use in communicating in the distribution network;
      use the information to communicate in the distribution network; and
      communicate in the distribution network via simplex communications during the allocated service periods.

17. A wireless station, comprising:
   a transmitter configured to transmit at least one frame;
   a receiver configured to receive at least one frame; and
   a processing system configured to provide, by an exchange of frames via the transmitter and receiver;
      secure network association services to a wireless device that wishes to join a distribution network; and
      information for the wireless device for use in communicating in the distribution network, wherein the information comprises at least one of scheduling or clock offset for service periods used for communicating in the distribution network.

* * * * *